US009358967B2

(12) United States Patent
Uchiyama et al.

(10) Patent No.: US 9,358,967 B2
(45) Date of Patent: Jun. 7, 2016

(54) ROTARY PUMP AND BRAKING SYSTEM HAVING THE SAME

(71) Applicants: DENSO CORPORATION, Kariya, Aichi-pref. (JP); Nippon Soken, Inc., Nishio, Aichi-pref. (JP); Advics Co., Ltd., Kariya, Aichi-pref. (JP)

(72) Inventors: Kazunori Uchiyama, Okazaki (JP); Naoki Hakamada, Anjo (JP); Kazuhide Uchida, Hamamatsu (JP); Yasuhiro Kawase, Nishio (JP); Takahiro Yamaguchi, Kariya (JP); Tomoaki Kawabata, Takahama (JP); Kunihito Ando, Okazaki (JP); Tadayoshi Usami, Anjo (JP)

(73) Assignees: DENSO CORPORATION, Kariya, Aichi-pref. (JP); ADVICS CO., LTD., Kariya (JP); NIPPON SOKEN, INC., Nishio, Aichi-pref. (JP)

( * ) Notice: Subject to any disclaimer, the term of this patent is extended or adjusted under 35 U.S.C. 154(b) by 83 days.

(21) Appl. No.: 14/062,056

(22) Filed: Oct. 24, 2013

(65) Prior Publication Data

US 2014/0117748 A1     May 1, 2014

(30) Foreign Application Priority Data

Oct. 26, 2012  (JP) ................................ 2012-236997

(51) Int. Cl.
*B60T 13/14*  (2006.01)
*F04C 2/10*  (2006.01)
*F04C 2/08*  (2006.01)
*F04C 15/00*  (2006.01)

(52) U.S. Cl.
CPC ............... *B60T 13/146* (2013.01); *F04C 2/086* (2013.01); *F04C 2/102* (2013.01); *F04C 15/0019* (2013.01); *F04C 15/0026* (2013.01); *F04C 15/0042* (2013.01)

(58) Field of Classification Search
CPC ....... B60T 13/16; B60T 13/161; F04C 2/102; F04C 2/0026; F04C 2/0019; F04C 2/0042; F04C 2/0086
See application file for complete search history.

(56) References Cited

U.S. PATENT DOCUMENTS 3,680,989 A * 8/1972 Brundage ........................ 418/71
6,743,005 B1   6/2004 Leemhuis
(Continued)

FOREIGN PATENT DOCUMENTS

JP    2004-011520    1/2004
JP    2007-263116   10/2007

OTHER PUBLICATIONS

Office Action dated Jul. 29, 2015, issued in the corresponding CN application No. 201310511558.1 with English translation.
(Continued)

*Primary Examiner* — Anna Momper
(74) *Attorney, Agent, or Firm* — Harness, Dickey & Pierce, P.L.C.

(57) ABSTRACT

A rotary pump has a linear groove formed on an end surface of a second side plate of an outer rotor. Thereby, it becomes possible to generate a force for pushing back the outer rotor to a sealing member side, and thus it becomes possible to reduce load applied to the second side plate. As a result, contact resistance between the outer rotor and the second side plate becomes smaller, and smoother pumping operation becomes possible. Further, since the force for pushing back the outer rotor to the first sealing member side is generated in the linear groove, it is possible to reduce an amount of decrease in a contacting area with the outer rotor and the second side plate, thereby reducing an amount of wear of the outer rotor and the second side plate.

6 Claims, 4 Drawing Sheets

(56) References Cited

U.S. PATENT DOCUMENTS

2003/0031578 A1 2/2003 Uchiyama et al.
2003/0227216 A1 12/2003 Uchiyama et al.

OTHER PUBLICATIONS

Office Action dated Oct. 13, 2015, issued in the corresponding Japanese Application No. 2012-236997 with English translation.

* cited by examiner

ROTARY PUMP AND BRAKING SYSTEM HAVING THE SAME

CROSS-REFERENCE TO RELATED APPLICATION

This application is based on and claims the benefit of priority from earlier Japanese Patent Application No. 2012-236997 filed Oct. 26, 2012, the description of which is incorporated herein by reference.

TECHNICAL FIELD

The present disclosure relates to an inscribed gear type rotary pump such as a trochoid pump that sucks and discharges the fluid, and a braking system having the rotary pump.

BACKGROUND

An inscribed gear type rotary pump such as a trochoid pump or the like is composed of an inner rotor having external teeth on an outer periphery thereof, an outer rotor having internal teeth on an inner periphery thereof, a casing that has a central plate and side plates for accommodating the inner rotor and the outer rotor, and the like.

The outer rotor and the inner rotor are disposed in the casing in a condition where the external teeth and the internal teeth are meshed to each other, and a plurality of gaps is formed by these meshed teeth.

It is necessary to seal low-pressure parts and high-pressure parts in such a rotary pump.

Therefore, one end surface of the rotary pump in an axial direction is sealed by pressing sealing members that are provided in the side plates to the rotors, and another end surface is mechanical sealed by pressing the rotors directly to the side plates.

Further, a recess is formed in the central plate and a sealing member is disposed in the recess, and an outer periphery of the outer rotor is sealed by bringing the sealing member into contact with the outer periphery of the outer rotor.

However, since the rotary pump configured in this manner has adopted a mechanical seal, torque loss of the rotary increases in slid-contacting surfaces between the side plates and the rotors, hence heat is generated accompanying the slid-contacting and a heated portion expands so that there is a possibility to reduce a pump discharge capacity.

Therefore, a rotary pump that has a structure to reduce the slid-contacting area between an end surface of the outer rotor in an axial diction and an end surface of the plate by forming an oil groove in a position in the side plate where a center line of the rotors and an outer edge of the outer rotor intersects is proposed in Japanese Patent Application Laid-Open Publication No. 2007-263116.

By reducing the sliding contact area between the end surface of the outer rotor in the axial diction and the end surface of the plate, it is possible to reduce the torque loss.

Since the contacting area between the end surface of the outer rotor in the axial diction and the end surface of the plate can be reduced corresponding to an area of the oil groove in the rotary pump disclosed in the Publication No. '116 mentioned above, contact resistance between the side plates and the outer rotor can be reduced.

However, since the contacting area, between the outer rotor and the side plates is reduced, load applied to contacting portions is increased correspondingly; an amount of wear of the outer rotor and the side plates increases.

Further, since the oil groove is formed so as to reach a gap formed between the central plate and the outer periphery of the outer rotor in an extensive range along the outer edge of the outer rotor in the rotary pump disclosed in the Publication No. '116, the reduction of the contacting area becomes large and the amount of wear becomes increased.

SUMMARY

An embodiment provides a rotary pump capable of reducing an amount of decrease in contacting areas between an outer rotor and side plates so that an amount of wear of the outer rotor and the side plates can be reduced.

In a rotary pump according to a first aspect, the rotary pump includes a rotating unit having an outer rotor provided with internal teeth on an inner periphery thereof, an inner rotor provided with external teeth on an outer periphery thereof and which rotates around a drive shaft as an axis, and a plurality of gaps formed between the meshed internal teeth and the external teeth.

The rotary pump further includes a casing, formed to cover the rotating unit, having a first side plate disposed on one axial end surface side of the rotating unit, a second side plate disposed on another axial end surface side of the rotating unit and which has a contacting surface to axial end surfaces of the inner rotor and the outer rotor that forms a mechanical seal, and a central plate disposed so as to surround an outer periphery of the outer rotor.

The rotary pump further includes an inlet port for sucking fluid into the rotating unit and a discharge port for discharging the fluid from the rotating unit, both provided in the casing.

The rotary pump further includes a first sealing member that divides spaces between the rotating unit and the first side plate into a low-pressure part connected to the inlet port and a high-pressure part connected to the discharge port, and a second sealing member that divides a gap formed between the outer periphery of the outer rotor and the central plate into the low-pressure part connected to the inlet port and the high-pressure part connected to the discharge port.

The rotary pump further includes a linear groove having a communication portion formed on a surface where the mechanical seal is performed among surfaces of the second side plate and connected to the high-pressure part of the gap, and a linear portion connected to the communication portion and which extends between the internal teeth and the outer periphery of the outer rotor.

In this way, the linear groove is formed on an end surface of the second side plate.

Therefore, it becomes possible to generate a force for pushing back the outer rotor to the first sealing member side by the fluid with high pressure supplied to the linear groove, and thus it becomes possible to reduce load applied to the second side plate of the outer rotor.

As a result, contact resistance between the outer rotor and the second side plate becomes smaller, and smoother pumping operation becomes possible.

Further, the force for pushing back the outer rotor to the first sealing member side is generated in the linear groove.

Therefore, it is possible to obtain a rotary pump capable of reducing an amount of decrease in a contacting area with the outer rotor and the second side plate, thereby reducing an amount of wear of the outer rotor and the second side plate.

In the rotary pump according to a second aspect, wherein, when a center line is defined as a line passing through a rotation axis of the outer rotor and a rotation axis of the inner rotor, the linear groove is provided in the inlet port side of the central line.

In the rotary pump according to a third aspect, wherein, the second side plate and the central plate are integrated, a recess that is recessed outwardly in a radial direction of the outer rotor is formed on an inner wall surface of the central plate, and the communication portion is extended from an inner wall surface of the recess in the radial direction of the outer rotor.

In a braking system according to a fourth aspect, the braking system includes a rotary pump, a brake fluid pressure generator for generating a brake fluid pressure based on a brake-pedaling force, a braking force generator for generating a braking force to wheels based on the brake fluid pressure, a main pipeline connected to the brake fluid pressure generator for transmitting the brake fluid pressure to the braking force generator, and an auxiliary pipeline connected to the brake fluid pressure generator for supplying the brake fluid to the main pipeline in order to increase the braking force.

The rotary pump is disposed so that the brake fluid of the brake fluid pressure generator side can be sucked from the inlet port via the auxiliary pipeline, and the brake fluid can be discharge towards the braking force generator from the discharge port via the main pipeline.

DETAILED DESCRIPTION OF THE PREFERRED EMBODIMENTS

With reference to the drawings, hereinafter will be described embodiments of the present disclosure.
(First Embodiment)

First, a basic configuration of a braking system is described with reference to FIG. 1.

Although an example of applying the braking system of the present disclosure to a vehicle constituting a hydraulic circuit of an X piping that includes each piping system of right front wheel-left rear wheel and left front wheel-right rear wheel will be described here, front-rear piping is also applicable.

Figure 1:
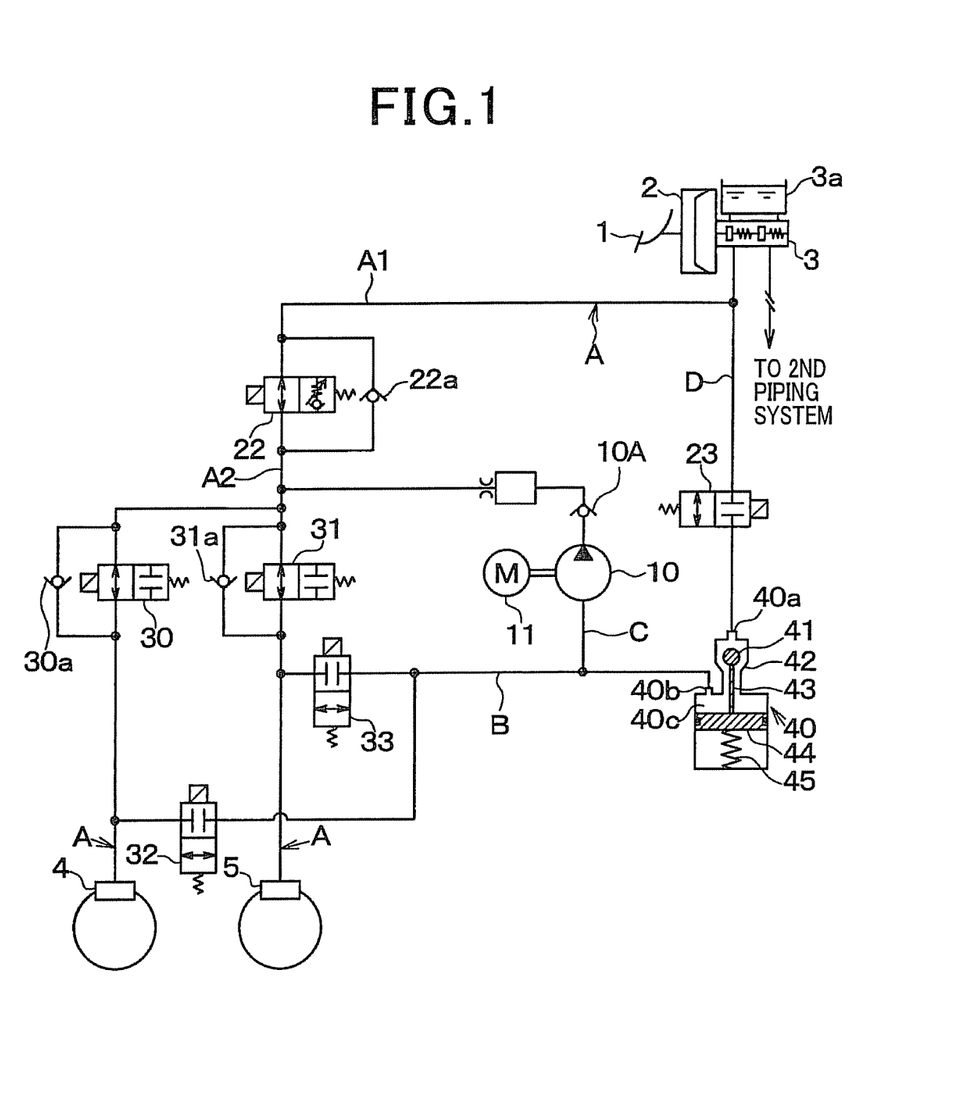
FIG. 1 shows a pipeline diagram of a braking system for a rotary pump according to a first embodiment of the present disclosure.

As shown in FIG. 1, a brake pedal 1 is connected to a booster 2, and a brake-pedaling force is boosted by this booster 2.

The booster 2 has a push rod or the like for transmitting the boosted, pedaling force to a master cylinder 3 (hereinafter referred to as M/C), and a M/C pressure is generated by pressing a master piston disposed in the M/C 3 by the push rod.

Then, the M/C pressure is transmitted to a wheel cylinder (hereinafter referred to as W/C) 4 for a right front wheel and a W/C 5 for a left rear wheel RL via a brake hydraulic pressure control actuator for performing ABS control, etc.

A master reservoir 3a is connected the M/C 3, for supplying the brake fluid into the M/C 3, or storing excess brake fluid within the M/C 3.

In addition, the brake pedal 1, the booster 2, and the M/C 3 correspond to a brake fluid pressure generator. In addition, the W/C 4, 5 correspond to a braking force is generator.

Although a first piping system for the right front wheel and the left rear wheel is described in the following description, a second piping system for the left front wheel and the right rear wheel is exactly the same as the first piping system.

A braking system is provided with a pipeline A (main pipeline) connected to the M/C 3.

A check valve 22a as well as a differential pressure control valve 22 that is controlled by an electronic control unit for a brake control (hereinafter, referred to the brake ECU) are provided in the pipeline A.

The pipeline A is divided into two parts by the differential pressure control valve 22.

Specifically, the pipeline A is divided into a pipeline A1 that receives the M/C pressure between the M/C 3 and the differential pressure control valve 22 from, and a pipeline A2 that receives the M/C pressure between the differential pressure control valve 22 and each W/C 4, 5.

The differential pressure control valve 22 is in a communicated state under a normal condition, however, when applying the brakes suddenly to the W/C 4, 5 when the M/C pressure is lower than a predetermined pressure, or during a traction controlling time, the differential pressure control valve 22 generates a predetermined pressure difference between the M/C side and the W/C side (differential pressure state).

The differential pressure control valve 22 may linearly adjust a set value of the differential pressure.

Further, the pipelines A are branched into two in the pipeline A2, and a pressure increase control valve 30 for controlling a pressure increase of the brake fluid pressure to the W/C 4 is provided to one end while another pressure increase control valve 31 for controlling a pressure increase of the brake fluid pressure to the W/C 5 is provided to another end.

These pressure increase control valves 30, 31 are configured as two-position valves that can control a communicated state and a closed state by the brake ECU.

When the two-position valve is controlled in communicated state, it is possible to add the M/C pressure or a brake fluid pressure from a discharge of a pump 10, which will be described later, to each W/C 4, 5.

These pressure increase control valves 30, 31 are to be a normally-opened-valve that is controlled in the communicated state at all times during a normal braking condition where no ABS control is executed.

Note that safety valves 30a, 31a are provided to each pressure increase control valves 30 and 31 in parallel, respectively, and the brake fluid is eliminated from the W/C 4, 5 when the ABS control is finished by ending stepping on the brakes.

Pressure reduction control valves 32, 33 that can control the communicated state and the closed state by the brake ECU are disposed in pipelines B (suction pipelines), respectively, that connect a pressure regulating reservoir 40 and the branched pipelines A in between each W/C 4, 5 and the increase pressure control valves 30, 31.

The pressure reducing control valves 32, 33, are to be a normally-closed-valve that is in the closed state at all times during the normal braking condition (ABS is inoperative).

A rotary pump 10 is disposed in a pipeline C (auxiliary pipeline) that connects the pressure regulating reservoir 40 and between the pressure increase control valve 22 and the differential pressure control valves 30, 31 in the pipeline A.

A safety valve 10A is provided to a discharge port side of the rotary pump 10 so that the brake fluid is prevented from reverse flowing.

A motor 11 is connected to the rotary pump 10, and the rotary pump 10 is driven by the motor 11.

Further, a pipeline D (auxiliary pipeline) is provided so as to connect the M/C 3 and the pressure regulating reservoir 40, and a two-position valve 23 is disposed in the pipeline D.

The two-position valve 23 is constituted to be a normally-closed-valve that is in a closed state during normal operation, and is driven during the brake assisting or the traction controlling time.

At this time, the two-position valve 23 is in the communicated state as well as the pipeline D, and the rotary pump 10 is operated in the condition where the pressure difference between the M/C pressure and the W/C pressure is held in the differential pressure control valve 22.

As a result, the brake fluid in the pipeline A1 is pumped out through the pipeline D and discharged into the pipeline A2, then the W/C pressure in the W/C 4, 5 is raised higher than the M/C pressure, and it becomes possible to increase the wheel braking power.

While regulating the pressure of the differential pressure between the M/C pressure and the brake fluid pressure in the reservoir, the pressure regulating reservoir 40 supplies the brake fluid to the rotary pump 10.

Reservoir ports 40a, 40b are provided in the control pressure reservoir 40, which are communicated with a reservoir chamber 40c respectively.

The reservoir port 40a is connected to the pipeline D and receives the brake fluid from the M/C 3 side.

The reservoir port 40b is connected to the pipeline B and the pipeline C, and receives the brake fluid discharged from the W/C 4, 5 and supplies the brake fluid to an intake side of the rotary pump 10.

A valve body 41 composed of a ball valve or the like is provided in an inner side of the reservoir ports 40a.

The valve body 41 controls the communication and the cutoff between the reservoir chamber 40c and pipeline D by contacting and separating the valve seat 42, and adjusts the distance between the valve seat 42 so that the differential pressure between the M/C pressure and internal pressure of the reservoir chamber 40c is regulated.

A rod 43 having a predetermined stroke for moving up and down the valve body 41 is provided separately from the valve body 41 below the valve body 41.

Further, a piston 44 interlocking with the rod 43 and a spring 45 that pushes the piston 44 toward the valve body 41 side to generate a force to extrude the brake fluid in the reservoir chamber 40c are provided inside the reservoir chamber 40c.

In the pressure regulating reservoir 40 configured in this manner, when a predetermined amount of the brake fluid is stored, the valve body 41 is seated on the valve seat 42 so that the brake fluid is prevented, from flowing into the pressure regulating reservoir 40.

Therefore, no more brake fluid than the suction capability of the rotary pump 10 can handle flows into the reservoir chamber 40c, and thus no high pressure is applied to the intake side of the rotary pump 10.

Next, a detailed structure of the rotary pump 10 according to the present embodiment is described with reference to FIGS. 2A-2C.

Figure 2A:
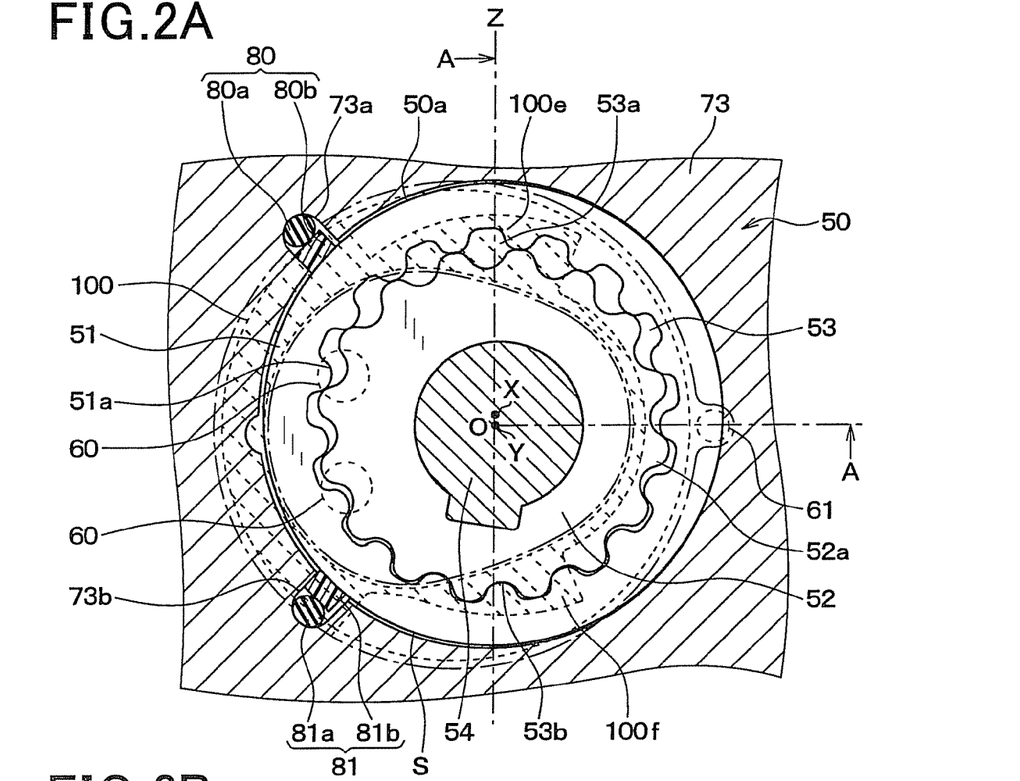
FIG. 2A shows a partial sectional front view of the rotary pump shown in FIG. 1.
Figure 2B:
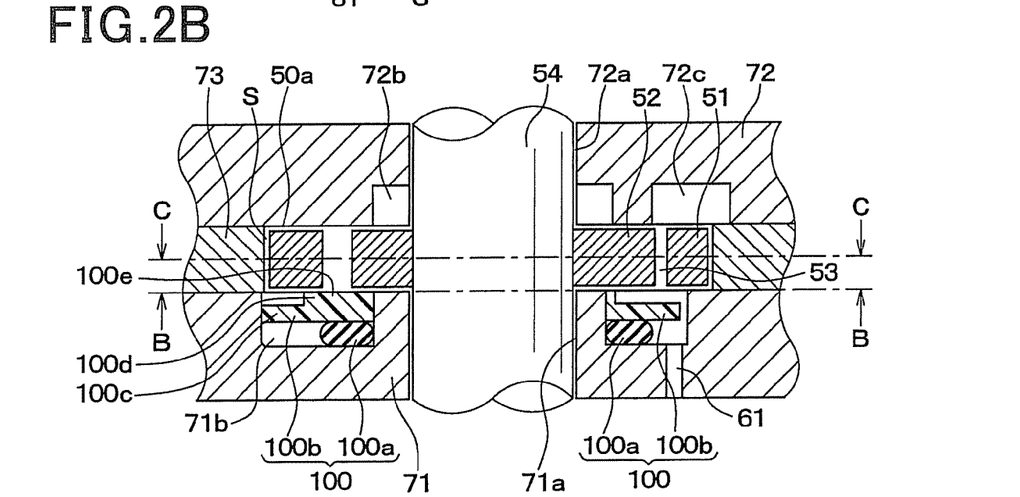
FIG. 2B shows a cross-sectional view taken along an A-O-A line of FIG. 2A.
Figure 2C:
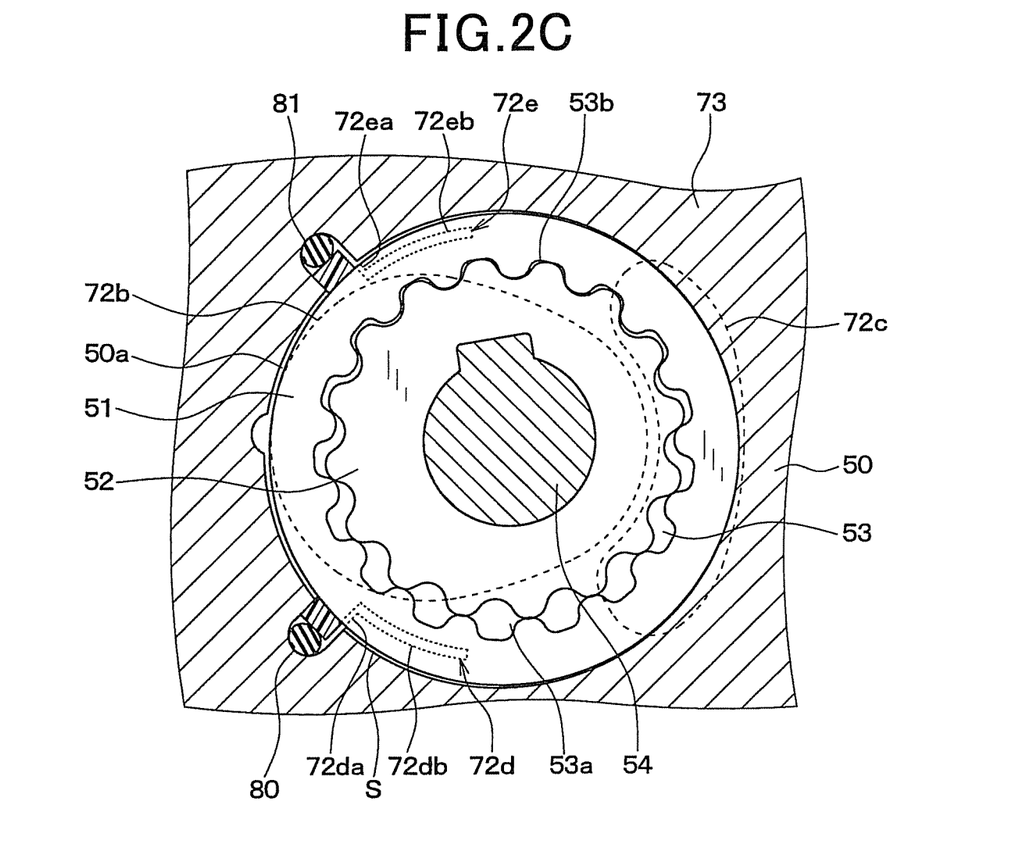
FIG. 2C shows a partial cross-sectional rear view of the rotary pump shown in FIG. 1.

FIGS. 2A-2C are diagrams showing a specific configuration of the rotary pump 10 in FIG. 1, and FIG. 2A corresponds to the B-B sectional view of FIG. 2B, FIG. 2B corresponds to the A-O-A sectional view of FIG. 2A, and FIG. 2C corresponds to the C-C sectional view of FIG. 2B.

The rotary pump 10 is constituted by a trochoid pump which is an inscribed gear pump, and as shown in FIGS. 2A-2C, the rotary pump 10 is disposed in a rotor chamber 50a formed in a casing 50.

An inner rotor 52 and an outer rotor 51 are assembled and accommodated inside the rotor chamber 50a in a state where central axes of the rotors (point Y and the point X in FIG. 2A) are disposed eccentrically.

The outer rotor 51 is provided with internal teeth 51a on an inner periphery thereof and the inner rotor 52 is provided with external teeth 52a on an outer periphery thereof.

The teeth 51a, 52a of the outer rotor 51 and the inner rotor 52 are meshed to each other and form a plurality of gaps 53 between the teeth 51a, 52a.

In addition, as can be seen from FIG. 2A, the rotary pump 10 of the present embodiment is a trochoid type pump having a multiple teeth without a partition plate (crescent), and forms the gaps 53 by the internal teeth 51a of the outer rotor 51 and the external teeth 52a of the inner rotor 52.

Further, in order to transmit the torque of the inner rotor 52, the outer rotor 51 and the inner rotor 52 have a structure having a plurality of contact points.

As shown in FIG. 2B, in the present embodiment, the casing 50 is constituted by first and second side plates 71, 72 and a central plate 73, and forms the rotor chamber 50a by a space enclosed by these plates.

The first and the second side plates 71, 72 are disposed so as to sandwich the rotors 51, 52 from both sides in an axial direction.

The central plate 73 is disposed between the first and second side plates 71, 72 and a bore that accommodates the outer rotor 51 and the inner rotor 52 therein is provided, and the central plate 73 is disposed so as to surround an outer periphery of the outer rotor 51.

A small gap S is formed between an inner periphery of the central plate 73 and the outer periphery of the outer rotor 51, and has a structure in which the brake fluid flows in.

As shown in FIG. 2B, central holes 71a, 72a that communicate with inside the rotor chamber 50a are formed in centers of the first and second side plates 71, 72, and a drive shaft 54 disposed on the inner rotor 52 is fitted to the central holes 71a, 72a.

The outer rotor 51 and the inner rotor 52 are rotatably disposed in the bore of the central plate 73.

More specifically, a rotating unit constituted by the outer rotor 51 and the inner rotor 52 is incorporated rotatably inside the rotor chamber 50a of the casing 50.

The outer rotor 51 rotates the point X as an axis, and the inner rotor 52 rotates the point Y as an axis as shown in FIG. 2A.

Further, when a center line Z of the rotary pump 10 is defined as a line passing through the point X and the point Y that are rotation axes of the respective inner rotor 52 and the outer rotor 51, inlet ports 60 and a discharge port 61 are formed on left and right across the center line Z of the first side plate 71.

Both the inlet ports 60 and the discharge port 61 are communicated with the rotor chamber 50a, and are disposed at positions that communicate with the plurality of the gaps 53.

Therefore, it is possible to suck the brake fluid from the outside into the gaps 53 through the inlet ports 60, and to discharge the brake fluid inside the gaps 53 to the outside through the discharge port 61.

Among the plurality of the gaps 53, a confined portion 53a whose volume is maximum and a confined portion 53b whose volume is minimum are configured not to communicate with any of the inlet ports 60 and the discharge port 61.

A differential pressure between a suction pressure at the inlet portions 60 and a discharge pressure at the discharge port 61 are kept by these confined portions 53a, 53b.

A recess 73a and another recess 73b that recess outwardly in a radial direction of the outer rotor 51 are formed on an inner wall surface of the central plate 73 at positions of about 45 degrees from the center line Z to a direction of the inlet ports 60 from the point X, which is a rotational axis of the outer rotor 51, as a center.

Sealing members 80, 81 as second, sealing members for suppressing the flow of the brake fluid in the outer periphery of the outer rotor 51 are provided in the recesses 73a, 73b.

The sealing members 80, 81 seal parts where the brake fluid pressure becomes high and low in the outer periphery of the outer rotor 51.

The sealing member 80 is composed of a rubber member 80a in a substantially cylindrical or spherical shape, and a resin member 80b that has a rectangular parallelepiped shape.

The resin member 80b contacts the outer rotor 51 by being pushed by the rubber member 80a, and seals the outer periphery of the outer rotor 51.

Since it has such a structure, even if an error occurs in a size of the outer rotor 51 by the manufacturing error or the like, this error is absorbed by the rubber member 80a having an elastic force, and thus the sealing is performed reliably.

A width of the resin member 80b (a width in a rotational direction of the outer rotor 51) is configured to form a gap to some extent when the resin member 80b is disposed in the recess 73a.

That is, if the resin member 80b is formed with the width equivalent to that of the recess 73a, it becomes difficult to come out when the resin member 80b enters in the recess 73a by the flow of the brake fluid pressure during the pump driving.

Therefore, by forming the resin member 80b so that the gap some extent is formed between the recess 73a, the brake fluid flows into the rubber member 80a side of the resin member 80b so that the resin member 80b is made easy to come out from the recess 73a by the pressure of the brake fluid.

Incidentally, the sealing member 81 is also configured to have a rubber member 81a and a resin member 80b, and description thereof will be omitted because it has the same structure as the sealing member 80.

Further, as shown in FIG. 2B, a sealing groove 71b is formed in the first side plate 71.

As shown by a dashed line in FIG. 2A, the sealing groove 71b is configured to have an annular shape (frame shape) surrounding the drive shaft 54, a width of the groove 71b is widened in the predetermined region, and is communicated with the discharge port 61.

A center of the sealing groove 71b is in a state of being eccentric (left side in the figure) to the inlet port 60 side relative to an axial center of the drive shaft 54.

Thereby, the sealing groove 71b is disposed so as to to pass between the drive shaft 54 and the discharge port 61, the confined portions 53a, 53b, and a part where the sealing member 80, 81 seal the outer rotor 51.

A sealing member 100 as a first sealing member is disposed in the sealing groove 71b.

The sealing member 100 is composed of an elastic member 100a made of an elastic material such as rubber, and a resin member 100b made of a resin, the resin member 100b is pressed against the inner rotor 52 side and the outer rotor 51 by the elastic member 100a.

The resin member 100b has a shape similar to the shape of the sealing groove 71b, which is an annular shape.

The resin member 100b is formed as a stepped plate that has a recessed portion 100c and a projected portion 100d formed on one end surface side thereof.

By disposing a surface where the projected portion 100d is formed on an opening side of the sealing groove 71b, the projected portion 100d of the resin member 100b contacts with the rotors 51, 52 and an end surface of the central plate 73.

Further, by disposing the elastic member 100a on a bottom side of the sealing groove 71b than the resin member 100b, the resin member 100b is pressed by the elastic force of the elastic member 100a and the discharge pressure of the brake fluid that has been introduced into the sealing groove 71b performs a sealing function.

The projected portion 100d is formed in a shape shown by the broken line hatching in FIG. 2A, and has sealed sections 100e, 100f.

The sealed section 100e and the sealed section 100f are disposed between a state where the discharge port 61 transits from a state of being communicated with the inlet ports 60 until a state of being communicated with the discharge port 61, and between a state where the discharge port 61 transits from a state of being communicated with the discharge port 61 until a state of being communicated with the inlet ports 60, respectively.

The sealed sections 100e, 100f are configured to have a width that at least covers the entire confined portions 53a, 53b, and seal the confined portions 53a, 53b.

High-pressure parts and low-pressure parts in a gap between the axial end surface of the outer rotor 51 and the inner rotor 52 and the first side plate 71 are sealed by the sealing member 100 disposed in this manner.

Specifically, between the high-pressured discharge port 61 and a low-pressured gap between the drive shaft 54 and the inner rotor 52, and between the high-pressured discharge port 61 and the low-pressured inlet ports 60 are sealed by the sealing member 100.

On the other hand, in the second side plate 72 side, a mechanical seal is done by having a rotor chamber 50a side end surface of the second side plate 72 abut directly on the axial end surfaces of the outer rotor 51 and the inner rotor 52.

High-pressure parts and low-pressure parts in a gap between the axial end surface of the outer rotor 51 and the inner rotor 52 and the second side plate 72 are sealed by the mechanical seal.

Specifically, between the high-pressured discharge port 61 and a low-pressured gap between the drive shaft 54 and the inner rotor 52, and between the high-pressured discharge port 61 and the low-pressured inlet ports 60 are sealed by the mechanical seal.

The mechanical seal is realized by having the sealing member 100 of the first side plate 71 side press the outer rotor 51 and the outer rotor 51 and the inner rotor 52 and the inner rotor 52 being pressed against the second side plate 72.

At this time, since the resin member 100b is pressed by the elastic force of the elastic member 100a and the discharge pressure of the brake fluid that has been introduced into the sealing groove 71b in the sealing member 100, the outer rotor 51 and the inner rotor 52 are pressed against the second side plate 72 at a high pressure.

Therefore, a rotational friction resistance between the second side plate 72 and inner rotor 52 and the outer rotor 51 increases, and a problem that the driving torque increases significantly occurs.

Accordingly, the present embodiment has a structure that an inlet groove 72b that communicates with the inlet ports 60 and a discharge groove 72c that communicates with the discharge port 61 are formed onto a side of the second side plate 72 where the mechanical seal is done as shown in FIG. 2B and FIG. 2C.

By the inlet groove 72b and the discharge groove 72c, the fluid pressure of the inlet ports 60 and the discharge port 61 is introduced therein, and the fluid pressure pushes back the outer rotor 51 and the inner rotor 52.

Thereby, the frictional resistance is reduced by reducing the force that presses the outer rotor 51 and the inner rotor 52 against the second side plate 72.

As a result, it becomes possible to prevent the increase of the driving torque.

However, the high pressure portion and the low pressure portion exist in the axial end surfaces of the outer rotor 51 and the inner rotor 52.

Therefore, the frictional resistance is reduced since the outer rotor 51 and the inner rotor 52 are pushed back to the sealing member 100 side by forming the discharge groove 72c at the high-pressured portion.

However, a force for pushing back the outer rotor 51 and the inner rotor 52 at the low-pressured portion is not enough.

More specifically, in the end surfaces of the outer rotor 51 and the inner rotor 52, the brake fluid pressure gradually decreases from the high-pressured discharge grooves 72c toward the low-pressured portion between the inner rotor 52 and the drive shaft 54, or toward the low-pressured inlet port 60 side.

Therefore, the force for pushing back the outer rotor 51 towards the sealing member 100 side is small in a path from the discharge groove 72c toward the sealing members 80, 81, particularly in the outer rotor 51 in a side of the sealing members 80, 81 from the center line Z.

Thus, a contact resistance between the outer rotor 51 and the second side plate 72 increases.

In contrast, an arc-shaped oil groove is formed along an outer edge of the outer rotor 51 at an intersection of the center line Z and the outer rotor 51 among the end surface of the second side plate 72 in the Publication No. '116 described above.

Thereby, the force for pushing back the outer rotor 51 to the sealing member 100 side is increased by guiding the high pressure to the oil groove, while a slid-contacting area between the outer rotor 51 and the end surface of the second side plate 72 is reduced.

However, by simply forming the oil groove, the contacting area between the outer rotor 51 and the second side plate 72 is reduced, and the load applied to a contacting portion increases correspondingly in a region where the oil groove is formed, i.e., in a wide range along the outer edge of the outer rotor 51.

Therefore, an amount of wear of the outer rotor 51 and the second side plate 72 is increased.

In order to solve this problem, linear grooves 72d, 72e are formed by, for example, laser processing on the end surface of the second side plate 72 in the present embodiment as shown in FIG. 2C.

Specifically, the linear grooves 72d, 72e are disposed in positions outer side in a radial direction of the confined portions 53a, 53b, between the sealing members 80, 81 and the center line Z, and outside the inlet groove 72b of the end surface of the second side plate 72.

The linear groove 72d has a structure having a communication portion 72da extending radially inward from the gap portion S, and a linear portion 72db connected to the communication portion 72da and extends between the internal teeth 51a of the outer periphery of the outer rotor 51 in the confined portion 53a side.

The linear groove 72e has a structure having a communication portion 72ea extending radially inward from the gap portion S, and a linear portion 72eb connected to the communication portion 72ea and extends between the internal teeth 51a of the outer periphery of the outer rotor 51 in the confined portion 53b side.

In the present embodiment, the communication portions 72da, 72ea are extended from the inner wall surfaces of the recesses 73a, 73b in the radial direction of the outer rotor 51 along the inner wall surfaces, and the linear portions 72db, 72eb are extended from the communication portions 72da, 72ea in a circumferential direction of the outer rotor 51.

Thus, the linear grooves 72d, 72e are provided to the second side plate 72, the linear grooves 72d, 72e are formed in a linear-groove shape, and only portions thereof be the communication portions 72da, 72ea connected to the gap S.

Therefore, it is possible to generate the force for pushing back the outer rotor 51 to the sealing member 100 side by introducing the high-pressured brake fluid from the gap portion S into the linear grooves 72d, 72e.

Then, at the same time, it is possible to reduce the amount of decrease in the contacting area between the outer rotor 51 and the second side plate 72 by the linear grooves 72d, 72e.

Therefore, the load applied to the contacting portions of the outer rotor 51 and the second side plate 72 can be received in a wider area compared with the structure of the Publication No. '116, thus it becomes possible to suppress the outer rotor 51 and the second side plate 72 being worn.

Although it has a structure that the communication portions 72da, 72ea of the linear grooves 72d, 72e are extends along the inner wall surfaces of the recesses 73a, 73b, such a structure is especially useful when integrating the second side plate 72 and the central plate 73.

For example, it is possible to form the linear grooves 72d, 72e by laser processing, but when the second side plate 72 and the central plate 73 are integrated, it is easy to form the linear grooves 72d, 72e if the previously formed inner wall surfaces of the recesses 73a, 73b are used as the basis when laser processing.

Therefore, it becomes possible to simplify the process of forming the communication portions 72da, 72ea of the linear grooves 72d, 72e by employing the above-described structure.

Next, an operation of the rotary pump 10 and a braking system that are configured in this manner are described.

When it is desired to increase the braking force by generating a larger W/C pressure than the M/C pressure generated by the operation of the brake pedal 1 by the driver in an occasion like a brake-assisting time, for example, the two-position valve 23 is in a suitably communicated state, and the differential pressure control valve 22 is in a differential pressure state.

Further, the rotary pump 10 is driven by controlling the motor 11 to perform suction/discharge of the brake fluid.

Specifically, the inner rotor 52 is rotated in accordance with the rotation of the drive shaft 54 by driving the motor 11, and accordingly, the outer rotor 51 rotates in the same direction by the meshing of the external teeth 52a and the internal teeth 51a.

At this time, since the volumes of the respective gaps 53 change in magnitude during the outer rotor 51 and the inner rotor 52 make one rotation, the brake fluid is sucked from the inlet ports 60, and the brake fluid is discharged toward the pipeline A2 from the discharge port 61.

The W/C pressure is boosted by the discharged brake fluid.

Thus, by rotating both rotors 51, 52 by the rotary pump 10, a basic pumping operation of sucking the brake fluid from the inlet ports 60 and discharging the brake fluid from the discharge port 61 is performed.

At this time, since it is a state in which the differential pressure is generated by a differential pressure control valve 22, the discharge pressure of the rotary pump 10 acts onto downstream of the differential pressure control valve 22, that is, onto each W/C 4, 5, and a larger W/C pressure than the M/C pressure is generated.

Therefore, it becomes possible to generate by the braking system the larger W/C pressure than the M/C pressure generated by the operation of the brake pedal 1 by the driver.

In the pumping operation at this time, the inlet port 60 side among the outer periphery of the outer rotor 51 is set as a suction pressure (atmospheric pressure) by the brake fluid sucked through the pressure regulating reservoir 40, and the discharge port 61 side among the outer periphery of the outer rotor 51 is set as a high discharge pressure.

For this reason, high-pressure parts and low-pressure parts occur in the periphery of the outer rotor 51. However, as described above, the low-pressure parts and the high-pressure parts of the outer periphery of the outer rotor 51 are separated by sealing therebetween with the sealing members 80, 81.

Therefore, a brake fluid leakage does not occur toward the low-pressure parts of the inlet port 60 side from the high-pressure parts of the discharge port 61 side through the outer circumference of the outer rotor 51.

Moreover, the inlet port 60 side of the outer periphery of the outer rotor 51 becomes a low pressure by the sealing members 80, 81, and becomes a pressure similar to the gaps 53 that communicate with the inlet ports 60.

Further, the discharge port 61 side of the outer periphery of the outer rotor 51 becomes a high pressure, and becomes a pressure similar to the gaps 53 that communicate with the discharge port 61.

Therefore, it becomes possible to maintain balancing the pressure inside and outside of the outer rotor 51 is, thus the pump can be driven stably.

Further, in the rotary pump 10 shown in the present embodiment, since the sealing members 80, 81 are positioned on the inlet port 60 side, up to a position surrounding the confined portions 53a, 53b among the outer periphery of the outer rotor 51 becomes high discharge pressure.

Therefore, the outer rotor 51 is pressed in a vertical direction in the figure, and in the confined portion 53a, the load is applied in the direction where the gaps between tips of the external teeth 52a of the inner rotor 52 and tips of the internal teeth 51a of the outer rotor 51 are shortened, thus the gaps between the tips of the external teeth 52a and the internal teeth 51a are shortened.

As a result, the brake fluid leakage occurs through the gaps between the tips of the external teeth 52a of the inner rotor 52 and the tips of the inner teeth 51a of the outer rotor 51 can be suppressed.

On the other hand, high-pressure parts and low-pressure parts occur in the gaps between axial end surfaces of the outer and inner rotors 51, 52 and the first and second side plates 71, 72 due, to the gap between the low-pressured inlet ports 60 or the drive shaft 54 and the inner rotor 52, and the high-pressured discharge port 61.

However, since the high-pressure parts and the low-pressure parts are sealed by the mechanical seal or the sealing member 100, the brake fluid leakage toward the low-pressure parts from the high pressure parts does not occur.

Moreover, since the sealing member 100 passes through the sealing members 80, 81, and the mechanical seal is also formed so as to contact with the sealing members 80, 81, brake fluid leakage never occurs between the sealing members 80, 81, 100.

Further, since the linear grooves 72d, 72e are formed on the end surface of the second side plate 72, it is possible to generate the force for pushing back the outer rotor 51 to the sealing member 100 side, and the load applied to the second side plate 72 from the outer rotor 51 can be reduced.

Thus, the contact resistance between the outer rotor 51 and the second side plate 72 becomes smaller, and smoother pumping operation becomes possible.

Further, the force for pushing back the outer rotor 51 to the sealing member 100 side is generated in the linear grooves 72d, 72e.

Therefore, it is possible to the rotary pump 10 being capable of reducing the amount of decrease in the contacting area with the outer rotor 51 and the second side plate 72, thereby reducing the amount of wear of the outer rotor 51 and the second side plate 72.

(Other Embodiments)

The present disclosure is not limited to the above embodiment; however, various modifications are possible within the scope of the present disclosure.

In addition, it should be appreciated that, in the subsequent embodiments, components identical with or similar to those in the first embodiment are given the same reference numerals, and structures and features thereof will not be described in order to avoid redundant explanation.

For example, although an example of the shape of the linear grooves 72d, 72e is shown in the first embodiment, other shapes may be accepted.

Figure 3A:
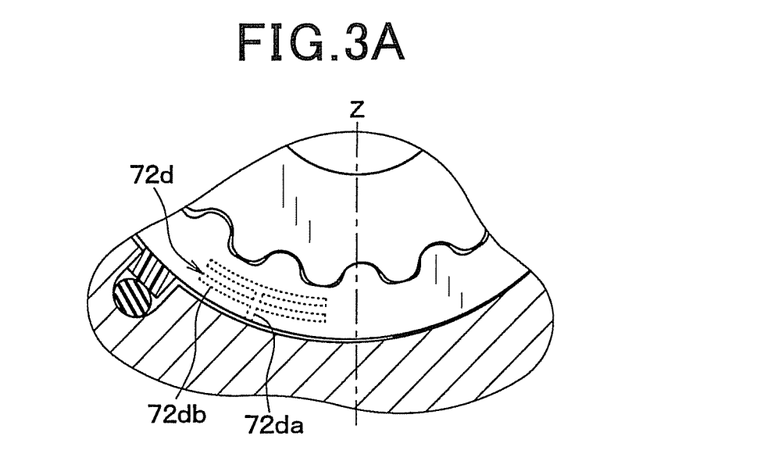
FIG. 3A shows a partially enlarged view of a vicinity of a linear groove described in a second embodiment.

For example, as shown in FIG. 3A, the linear portion 72db may be provided for a plurality of numbers, for example, two in the figure.

Even in this case, by connecting the gap portion S to each linear portion 72db through the communication portion 72da, it is possible that high pressure to be introduced into each linear portion 72db.

Further, since a forming position of the communication portion 72da is not necessary to be positioned along the inner wall surface of the recess 73a, it may be formed in the discharge port 61 side of the recess 73a as shown in FIG. 3A.

Figure 3B:
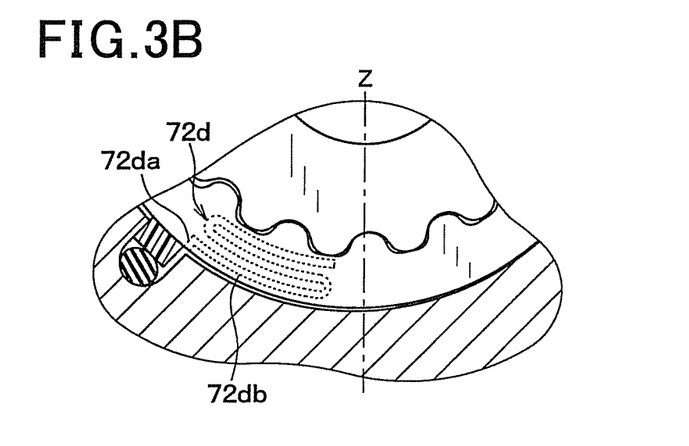
FIG. 3B shows a partially enlarged view of a vicinity of a linear groove described in a third embodiment.

In addition, it is also possible that the linear portion 72db may be formed in a meandering shape with the circumferential direction of the outer rotor 51 be a longitudinal direction of the meandering shape as shown in FIG. 3B.

Figure 3C:
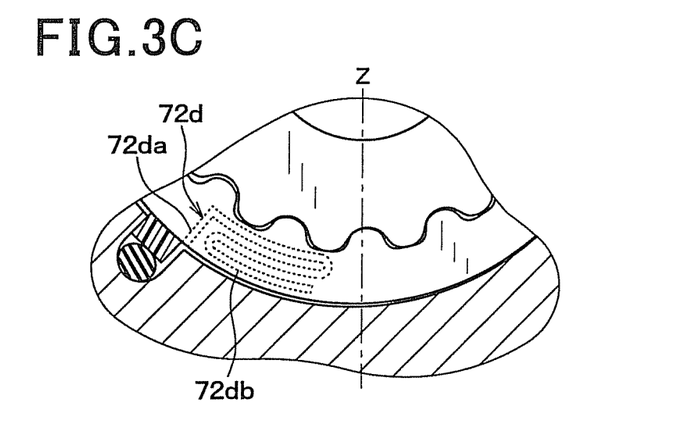
FIG. 3C shows a partially enlarged view of a vicinity of a linear groove described in a fourth embodiment.

Furthermore, the communication portion 72da may be extended to the internal teeth 52a side, as shown in FIG. 3C, and the linear portion 72db may begin meandering from that point outwardly in the radial direction with the circumferential direction of the outer rotor 51 be a longitudinal direction of the meandering shape.

Figure 3D:
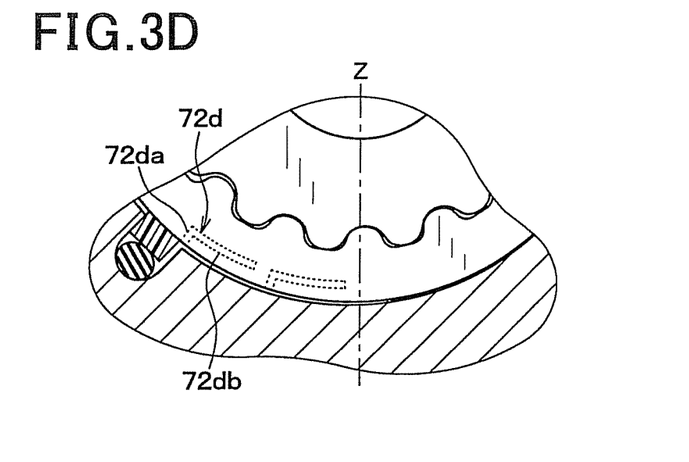
FIG. 3D shows a partially enlarged view of a vicinity of a linear groove described in a fifth embodiment.

Moreover, a plurality of linear grooves 72d, two in side by side, for example, may be further placed in the circumferential direction as shown in FIG. 3D.

Although only the linear groove 72d is shown in FIG. 3A to FIG. 3D, a similar structure can also be applied the other linear groove 72e.

Further, a case of both the linear grooves 72d, 72e being provided is described in the first embodiment, however, the force for pushing back the outer rotor 51 to the sealing member 100 side can be generated even if only one of them is provided.

Furthermore, the linear portion 72*db*, 72*eb* may be shaped in an arc shape along the circumferential direction of the outer rotor 51, and also, for example, may be formed straight extending perpendicular relative to the radial direction.

Moreover, the linear grooves 72*d*, 72*e*, disposed between the sealing members 80, 81 and the center line Z of the end surface of the second side plate 72 in the first embodiment.

This is because the force for pushing back the outer rotor 51 to the sealing member 100 side becomes smaller towards the sealing member 80, 81 side from the center line Z of the outer rotor 51.

For this reason, placing the linear grooves 72*d*, 72*e* in this location is most effective, however, the linear grooves 72*d*, 72*e* may not to be positioned between the sealing members 80, 81 and the center line Z, but the linear grooves 72*d*, 72*e* may from be formed beyond the center line Z to the outlet 61 side.

In the first embodiment mentioned above has a structure having the first side plate 71 as the casing 50.

However, this is also an example, and when various components of the rotary pump 10 are accommodated in a housing that constitutes a brake hydraulic pressure control actuator, it is also possible to configure the first side plate 71 by this housing.

What is claimed is:

1. A rotary pump comprising:
    a rotating unit having an outer rotor provided with internal teeth on an inner periphery thereof, an inner rotor provided with external teeth on an outer periphery thereof meshed with the internal teeth and which rotates around a drive shaft on an axis, and a plurality of gaps formed between the meshed internal teeth and the external teeth;
    a casing, formed to cover the rotating unit, the casing having a first side plate disposed on one axial end surface side of the rotating unit, a second side plate disposed on another axial end surface side of the rotating unit which has a contacting surface to axial end surfaces of the inner rotor and the outer rotor that forms a mechanical seal, and a central plate disposed so as to surround an outer periphery of the outer rotor;
    an inlet port for sucking fluid into the rotating unit and a discharge port for discharging the fluid from the rotating unit, both provided in the casing;
    a first sealing member that divides spaces between the rotating unit and the first side plate into a low-pressure part connected to the inlet port and a high-pressure part connected to the discharge port;
    a second sealing member that divides a gap formed between the outer periphery of the outer rotor and the central plate into the low-pressure part connected to the inlet port and the high-pressure part connected to the discharge port; and
    a linear groove having a communication portion formed on a surface where the mechanical seal is performed among surfaces of the second side plate and connected to the high-pressure part of the gap, and a linear portion connected to the communication portion and which extends between the internal teeth and the outer periphery of the outer rotor; wherein
    a center line is defined as a line passing through a rotation axis of the outer rotor and a rotation axis of the inner rotor, the linear groove is provided on an inlet port side of the center line; and
    the entire portion of the linear groove is disposed on an end surface of the second side plate on the inlet port side of the center line and in a position radially outside of the plurality of gaps.

2. The rotary pump according to claim 1, wherein,
    the second side plate and the central plate are integrated;
    a recess that is recessed outwardly in a radial direction of the outer rotor is formed on an inner wall surface of the central plate; and
    the communication portion is extended from an inner wall surface of the recess in the radial direction of the outer rotor.

3. The rotary pump according to claim 1, wherein the linear groove is disposed between the second sealing member and the center line.

4. A braking system comprising:
    a rotary pump;
    a brake fluid pressure generator for generating a brake fluid pressure based on a brake-pedaling force;
    a braking force generator for generating a braking force to wheels based on the brake fluid pressure;
    a main pipeline connected to the brake fluid pressure generator for transmitting the brake fluid pressure to the braking force generator; and
    an auxiliary pipeline connected to the brake fluid pressure generator for supplying the brake fluid to the main pipeline in order to increase the braking force; wherein
    the rotary pump comprises:
    a rotating unit having an outer rotor provided with internal teeth on an inner periphery thereof, an inner rotor provided with external teeth on an outer periphery thereof and which rotates around a drive shaft as an axis, and a plurality of gaps formed between the meshed internal teeth and the external teeth;
    a casing, formed to cover the rotating unit, having a first side plate disposed on one axial end surface side of the rotating unit, a second side plate disposed on another axial end surface side of the rotating unit and which has a contacting surface to axial end surfaces of the inner rotor and the outer rotor that forms a mechanical seal, and a central plate disposed so as to surround an outer periphery of the outer rotor;
    an inlet port for sucking fluid into the rotating unit and a discharge port for discharging the fluid from the rotating unit, both provided in the casing;
    a first sealing member that divides spaces between the rotating unit and the first side plate into a low-pressure part connected to the inlet port and a high-pressure part connected to the discharge port; and
    a second sealing member that divides a gap formed between the outer periphery of the outer rotor and the central plate into the low-pressure part connected to the inlet port and the high-pressure part connected to the discharge port;
    a linear groove having a communication portion formed on a surface where the mechanical seal is performed among surfaces of the second side plate and connected to the high-pressure part of the gap, and a linear portion of the linear groove connected to the communication portion and which extends between the internal teeth and the outer periphery of the outer rotor; wherein,
    the rotary pump is disposed so that the brake fluid of the brake fluid pressure generator side can be sucked from the inlet port via the auxiliary pipeline, and the brake fluid can be discharged towards the braking force generator from the discharge port via the main pipeline;

a center line is defined as a line passing through a rotation axis of the outer rotor and a rotation axis of the inner rotor, the linear groove is provided on an inlet port side of the center line; and the entire portion of the linear groove is disposed on an end surface of the second side plate on the inlet port side of the center line and in a position radially outside of the plurality of gaps.

5. The braking system according to claim 4, wherein, the second side plate and the central plate are integrated;

a recess that recesses outwardly in a radial direction of the outer rotor is formed on an inner wall surface of the central plate;

the communication portion is extended from an inner wall surface of the recess in the radial direction of the outer rotor.

6. The rotary pump according to claim 4, wherein the linear groove is disposed between the second sealing member and the center line.

* * * * *